US008644283B2

(12) United States Patent
Lien et al.

(10) Patent No.: US 8,644,283 B2
(45) Date of Patent: Feb. 4, 2014

(54) FEMTOCELL BASE STATION, NETWORK RESOURCE ALLOCATION METHOD, AND NON-TRANSITORY TANGIBLE MACHINE-READABLE MEDIUM THEREOF

(75) Inventors: Shao-Yu Lien, Kaohsiung (TW); Kwang-Cheng Chen, Taipei (TW); Kanchei Loa, Taipei (TW)

(73) Assignee: Institute for Information Industry, Taipei (TW)

( * ) Notice: Subject to any disclaimer, the term of this patent is extended or adjusted under 35 U.S.C. 154(b) by 300 days.

(21) Appl. No.: 13/252,291

(22) Filed: Oct. 4, 2011

(65) Prior Publication Data

US 2012/0082108 A1  Apr. 5, 2012

Related U.S. Application Data

(60) Provisional application No. 61/389,728, filed on Oct. 5, 2010.

(51) Int. Cl.
*H04W 4/00* (2009.01)

(52) U.S. Cl.
USPC .......................................................... 370/338

(58) Field of Classification Search
USPC ............. 370/328–330, 338; 455/422.1–426.1
See application file for complete search history.

(56) References Cited

U.S. PATENT DOCUMENTS

| | | | |
|---|---|---|---|
| 7,522,935 B2* | 4/2009 | Rey et al. | 455/522 |
| 7,899,451 B2* | 3/2011 | Hu et al. | 455/422.1 |
| 8,340,038 B2* | 12/2012 | Guvenc | 370/329 |
| 8,374,622 B2* | 2/2013 | Trudeau | 455/453 |
| 8,385,197 B2* | 2/2013 | Krym et al. | 370/230 |
| 2004/0037258 A1* | 2/2004 | Scherzer et al. | 370/338 |
| 2009/0135776 A1* | 5/2009 | Sashihara | 370/329 |
| 2009/0154426 A1* | 6/2009 | Perraud et al. | 370/332 |
| 2009/0221295 A1 | 9/2009 | Sahin et al. | |
| 2009/0257390 A1 | 10/2009 | Ji et al. | |
| 2010/0216486 A1 | 8/2010 | Kwon et al. | |
| 2011/0205980 A1* | 8/2011 | Prakash et al. | 370/329 |

OTHER PUBLICATIONS

Ashraf, I.; Ho, L.T.W.; Claussen, H.; "Improving Energy Efficiency of Femtocell Base Stations Via User Activity Detection." Wireless Communications and Networking Conference (WCNC), 2010 IEEE (1525-3511) (978-1-4244-6396-1) 2010, p. 1-5.*

(Continued)

*Primary Examiner* — Thai Hoang
(74) *Attorney, Agent, or Firm* — Skaar Ulbrich Macari, P.A.

(57) ABSTRACT

A femtocell Base Station (femto-BS), a network resource allocation method, and a non-transitory tangible machine-readable medium thereof are provided. There are a plurality of available network resource units. The femto-BS determines an expected value that is related to the available network resource units being used by the femto-BS and its neighboring femto-BSs without having interferences. The expected value is related to a number of the available network resource units and a number of the neighboring femto-BSs. Based on the expected value, the femto-BS calculates a plurality of strategy probability values that are related to different numbers of the available network resource units used by the femto-BS. The femto-BS calculates an assigned number according to the strategy probability values. Among the available network resource units, the femto-BS can use the assigned number of them.

17 Claims, 3 Drawing Sheets

(56) References Cited

OTHER PUBLICATIONS

Zheng, W.; Su, T.; Zhang, H.; Li, W.; Chu, X.; Wen, X.; "Distributed power optimization for spectrum-sharing femtocell networks: A fictitious game approach." Journal of Network and Computer Applications (1084-8045). Available online Mar. 15, 2013.*

Capdevielle, V.; Feki, A.; Gupta, P.; Andrews, M.; "Autonomous spectrum sharing for unstructured cellular networks with femtocells." Bell Labs Technical Journal (1089-7089) Dec. 1, 2010. vol. 15, Iss.3; p. 85-97.*

Extended European Search Report for European Applicaiton No. 11183463.6 by teh European Patent Office (EPO) to the European counterpart of the subject patent application on Feb. 6, 2012, 5 pages.

* cited by examiner

FEMTOCELL BASE STATION, NETWORK RESOURCE ALLOCATION METHOD, AND NON-TRANSITORY TANGIBLE MACHINE-READABLE MEDIUM THEREOF

This application claims the benefit of priority based on U.S. Provisional Application Ser. No. 61/389,728 filed on Oct. 5, 2010, which is hereby incorporated herein by reference in its entirety.

FIELD

The present invention relates to a femtocell base station (femto-BS), a network resource allocation method, and a non-transitory tangible machine-readable medium thereof. More particularly, the femto-BS, the network resource allocation method, and the non-transitory tangible machine-readable medium thereof of the present invention utilize surrounding environment information of the femto-BS for network resource allocation.

BACKGROUND

It has long been a problem that using a wireless communication network in an indoor environment suffers from a poor signal reception effect and a low transmission rate. This is mainly because high-frequency wireless signals are attenuated quickly after passing through wall barriers. Therefore, it is difficult to obtain satisfactory signal quality in the indoor environments. Although several kinds of communication apparatuses using different network interfaces (e.g., Wireless Fidelity (Wi-Fi) and High Speed Packet Access (HSPA)) have been provided in the market to solve this problem, these communication devices increase the cost to the users. Femtocell base stations (femto-BSs) are designed to solve various problems of indoor wireless communications. Since femto-BSs belong to cellular communication systems, they are able to perform seamless handover. Hence, the quality of indoor wireless communications can be improved.

It is possible that the femto-BSs are deployed very close to each other. The femto-BSs that are very close to each other are called co-located femto-BSs. If a lot of femto-BSs are deployed within the signal coverage of one macrocell (i.e. these femto-BSs will use same frequency band or same channel), it will be difficult to allocate network resources (e.g., wireless resources) to these femto-BSs in an orthogonal manner because the amount of network resources is limited. In this case, the network resources are shared by the co-located femto-BSs. When the co-located femto-BSs are in high density, allocation of network resources becomes a tough issue.

Prior art technologies allocate network resources for co-located femto-BSs in a random allocation manner or in an average allocation manner. The random allocation manner means that the available network resource units are accessed randomly by a femto-BS that needs one. The average allocation manner means that the number of the available network resources is averaged with reference to the number of the co-located femto-BSs so as to derive an averaged number and then each of the co-located femto-BSs is able to use the averaged number of the available network resources. Apparently, the average allocation manner fails in considering the demand of individual femto-BSs, so the network resources cannot be used efficiently and interferences tend to be caused.

Accordingly, a mechanism that allocates network resources more efficiently and that causes less interference is in an urgent need in this field.

SUMMARY

To solve the aforesaid problem, a femtocell base station (femto-BS), a network resource allocation method, and a non-transitory tangible machine-readable medium thereof are provided in the present invention.

The femto-BS of certain embodiments of the present invention comprises a plurality of neighboring femto-BSs. The femto-BS and the neighboring femto-BSs belong to a wireless network. The femto-BS comprises a transceiver and a processor, wherein the transceiver and the processor are electrically connected to each other. The transceiver is configured to receive a frame. The processor is configured to determine that the wireless network has a plurality of available network resource units according to the frame. The processor is further configured to determine an expected value that is related to the available network resource units being used by the femto-BS and the neighboring femto-BSs without having interference. The expected value is related to a number of the available network resource units and a number of the neighboring femto-BSs. The processor is further configured to calculate a plurality of strategy probability values that are related to different numbers of the available network resource units used by the femto-BS according to the expected value. The processor is further configured to calculate an assigned number according to the strategy probability values, wherein the femto-BS is able to use the assigned number of the available network resource units.

The network resource allocation method of certain embodiments of the present invention is for use in a femto-BS. The femto-BS comprises a plurality of neighboring femto-BSs, and the femto-BS and the neighboring femto-BSs belong to a wireless network. The network resource allocation method comprises the steps of: (a) enabling the femto-BS to determine that the wireless network has a plurality of available network resource units, (b) enabling the femto-BS to determine an expected value that is related to the available network resource units being used by the femto-BS and the neighboring femto-BSs without having interference, wherein the expected value is related to a number of the available network resource units and a number of the neighboring femto-BSs, (c) enabling the femto-BS to calculate a plurality of strategy probability values that are related to different numbers of the available network resource units used by the femto-BS according to the expected value, and (d) enabling the femto-BS to calculate an assigned number according to the strategy probability values, wherein the femto-BS is able to use the assigned number of the available network resource units.

The non-transitory tangible machine-readable medium of certain embodiments of the present invention comprises a computer program stored therein. The computer program is able to execute the aforementioned network resource allocation method when being loaded into a femto-BS.

According to the above descriptions, the femto-BS and the network resource allocation method of the present invention utilize surrounding environment information (e.g., the number of the available network resource units and the number of the neighboring femto-BSs) of the femto-BS for network resource allocation, so the network resources can be utilized more efficiently and with less interference.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, the femtocell base station (femto-BS), the network resource allocation method, and the non-transitory tangible machine-readable medium thereof of the present invention will be explained with reference to example embodiments thereof. However, these example embodiments are not intended to limit the present invention to any specific example, environment, embodiment applications, or particular implementations described in these example embodiments. Therefore, descriptions of these embodiments are only for purpose of illustration but not to limit the present invention. It should be appreciated that, in the following embodiments and the attached drawings, elements unrelated to the present invention are omitted from depiction.

Figure 1A:
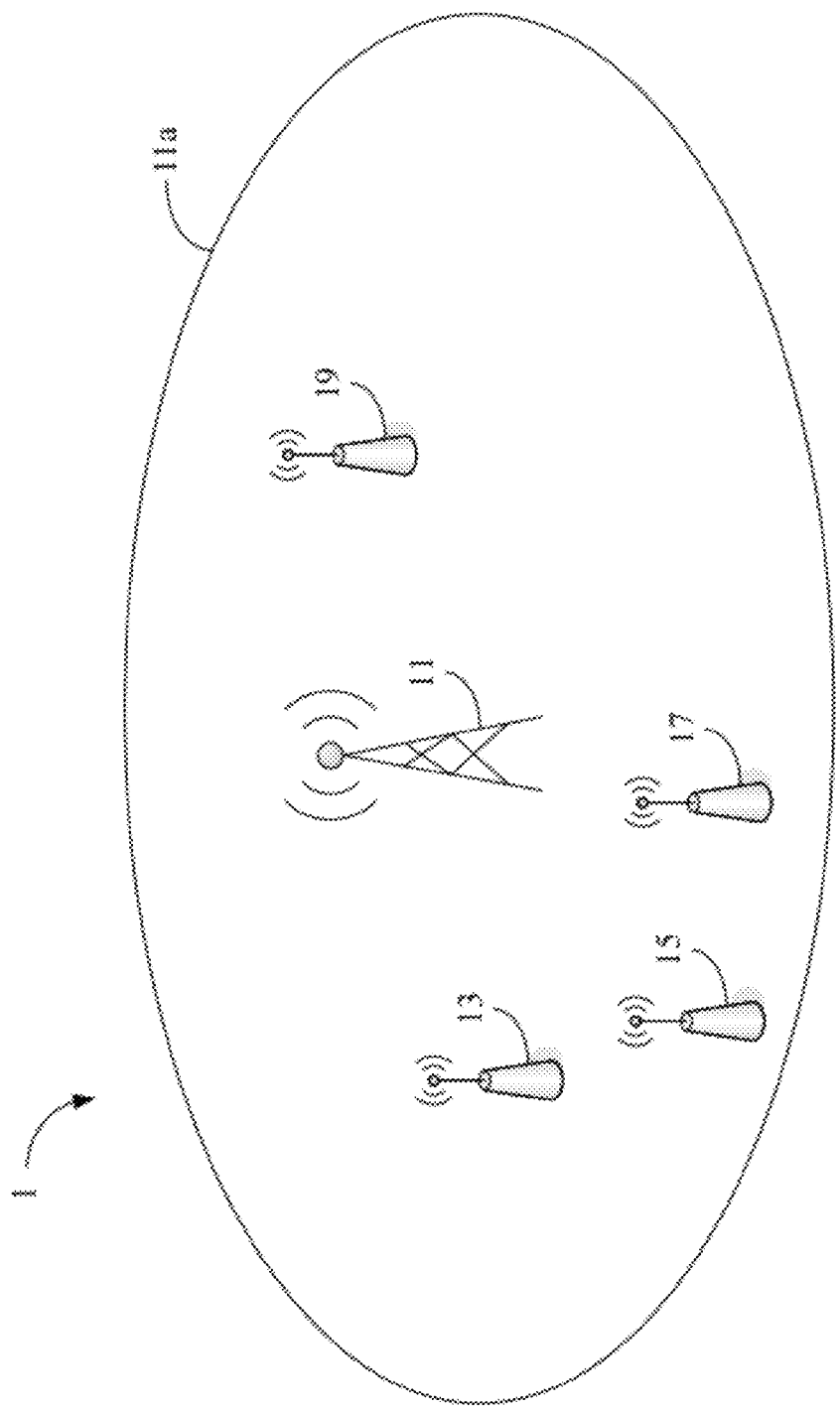
FIG. 1A is a schematic view of a wireless network system of a first and a second embodiment of the present invention.

A first embodiment of the present invention is a wireless network 1, a schematic view of which is depicted in FIG. 1A. The wireless network 1 comprises a macrocell 11 and four femto-BSs 13, 15, 17, and 19. The macrocell 11 has a signal coverage 11a, and the femto-BSs 13, 15, 17, and 19 are deployed in the signal coverage 11a. When being deployed in this manner, the femto-BSs 13, 15, 17, and 19 are called co-located femto-BSs. It shall be appreciated that the present invention does not limit the number of the femto-BSs; in other words, the wireless network may comprise different numbers of femto-BSs in other embodiments.

In this embodiment, the femto-BSs 13, 15, 17, and 19 adopt a same network resource allocation method. Therefore, only the operations of the femto-BS 13 will be detailed hereinbelow, and operations of the femto-BSs 15, 17, and 19 can be readily inferred from this. As described above, the femto-BSs 13, 15, 17, and 19 are co-located femto-BSs, so the femto-BSs 15, 17, and 19 are neighboring femto-BSs of the femto-BS 13.

Figure 1B:
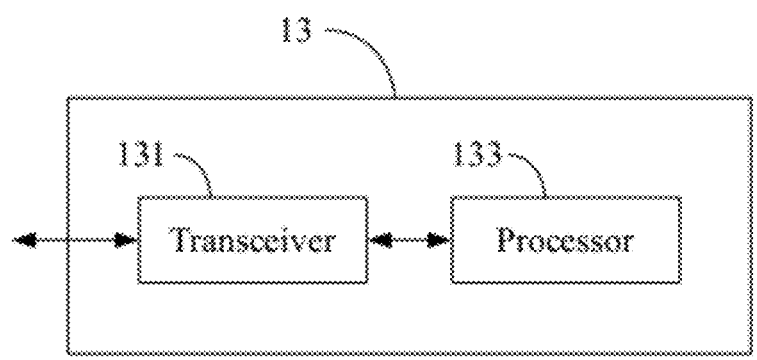
FIG. 1B is a schematic view of the internal components of a femto-BS of the present invention.

FIG. 1B depicts a schematic view of the internal components of the femto-BS 13. The femto-BS 13 comprises a transceiver 131 and a processor 133, wherein the transceiver 131 and the processor 133 are electrically connected to each other. The transceiver 131 may be any of various transceivers well known to people having ordinary skill in the art. The processor 133 may be any of various processors, central processing units, microprocessors, or other computing devices well known to people having ordinary skill in the art.

The transceiver 131 is configured to receive a frame. The processor 133 is configured to determine that the wireless network 1 has a plurality of available network resource units according to the frame and derives a number of the available network resource units. Hereinbelow, the number of the available network resource units will be denoted by a parameter $M_a$. The available network resource units vary with the encoding technology adopted by the wireless network 1.

Figure 1C:
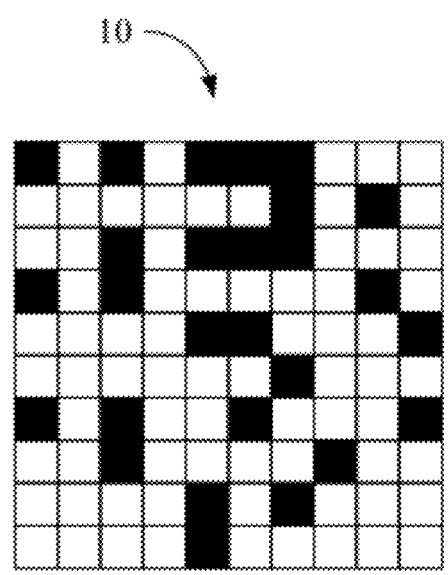
FIG. 1C is a schematic view illustrating an OFDM frame.

For example, if the technology of Orthogonal Frequency Division Multiplexing (OFDM) is adopted in the wireless network 1, then a network resource unit is a resource block in a frame. FIG. 1C depicts a frame 10 conforming to the OFDM technology, where each grid represents a resource block. Hence, each grid can be treated as a network resource unit of the present invention. In FIG. 1C, each black grid represents a network resource unit that has been used, while each white grid represents an available network resource unit. If the technology of Wideband Code Division Multiple Access (WCDMA) is adopted in the wireless network 1, the network resource unit will be a ratio of code division.

It is noted that the way to determine which network resource units are available in the wireless network 1 according to the received frame is well known to those skilled in the art, so no further description will be made herein. The following description will be focused on the way to allocate the available network resource units.

The femto-BS 13 is able to know its neighboring femto-BSs. As an example, the processor 133 is able to learn that the femto-BSs 15, 17, and 19 are its neighboring femto-BSs according to the strength of the signals received by the transceiver 131 and learns a number of the neighboring femto-BSs (denoted by a variable N). Then, a number of the co-located femto-BSs (denoted by a variable S) can be learned from the number of the neighboring femto-BSs (i.e. the variable N). To be more specific, the number of co-located femto-BSs is equal to the number of neighboring femto-BSs plus one, where the numeral value one represents the femto-BS 13 itself. The way to learn the neighboring femto-BSs is well known to those skilled in the art, so the details are not described herein.

Next, the processor 133 determines an expected value that is related to the available network resource units being used by the femto-BS 13 and the neighboring femto-BSs (i.e., the femto-BSs 15, 17, and 19) without having interference. The expected value is related to the number of the available network resource units (i.e. $M_a$) and the number of the neighboring femto-BSs (i.e. N). Since the expected value is related to the number of the neighboring femto-BSs (i.e. N), it is also related to the number of the co-located femto-BSs (i.e. S). For example, the processor 133 can utilize the number of the available network resource units (i.e. $M_a$) and the number of the neighboring femto-BSs (i.e. N) to determine the expected value.

Afterwards, the processor 133 calculates a plurality of strategy probability values that are related to different numbers of the available network resource units used by the femto-BS 13 according to the expected value. For convenience of the following description, the strategy probability values are denoted by $P=\{p_{l_s}\}$, where the values of the suffix $l_s$ of the variable $p_{l_s}$ ranges from 1 to $M_a$. In other words, the processor 133 calculates a strategy probability value $p_1$ that one available network resource unit is used by the femto-BS 13, a strategy probability value $p_2$ that two available network resource units are used by the femto-BS 13, . . . , and a strategy probability value $p_{Ma}$ that $M_a$ available network resource units are used by the femto-BS 13. It shall be appreciated that, a sum of $p_1, p_2, \ldots,$ and $p_{Ma}$ is 1. The processor 133 then calculates an assigned number according to the strategy probability values (i.e., $P=\{p_{l_s}\}=\{p_1, p_2, \ldots, p_{M_a}\}$), wherein the femto-BS 13 is able to use the assigned number of available network resource units.

Compare to the prior art, the processor 133 of the femto-BS 13 of the first embodiment takes at least two pieces of surrounding environment information (i.e., the number of the available network resource units, $M_a$, and the number of the neighboring femto-BSs, N) into consideration when calculating the assigned number of network resource units to be used. Therefore, the network resource units can be utilized efficiently and the probability of occurring interferences can be reduced.

A second embodiment of the present invention is also the wireless network 1. The second embodiment differs from the first embodiment in the way that the processor 133 of the femto-BS 13 allocates the available network resource units. In the following descriptions, only the differences between the first and second embodiment are described.

The femto-BS 13 proceeds to allocate network resource after learning the number of neighboring femto-BSs (i.e. N) and the number of available network resource units (i.e. $M_a$) in the wireless network 1. Specifically, the processor 133 determines the expected value according to the number of the available network resource units (i.e. $M_a$), the number of the neighboring femto-BSs (i.e. N), the strategy probability values (i.e. $P=\{p_{l_s}\}=\{p_1, p_2, \ldots, p_{M_a}\}$), and a probability value that any of the available network resource units is used by only one of the femto-BS 13 and the neighboring femto-BSs (i.e. the femto-BSs 15, 17, and 19). For example, the processor 133 may determine the expected value according to Equation (1):

$$E[j] = \sum_{g=1}^{M_a} \sum_{l_1,\ldots,l_S} g C_g^{M_a} q_1^g (1-q_1)^{M_a-g} \prod_{s=1}^{S} p_{l_s} \quad (1)$$

where E[j] represents the expected value and the parameter $q_1$ represents the probability value that any of the $M_a$ available network resource units is used by only one of the femto-BS 13 and the neighboring femto-BSs (i.e., the femto-BSs 15, 17, and 19). Furthermore, the processor 13 may calculate the parameter $q_1$ according to Equation (2):

$$q_1 = \sum_{s=1}^{S} \frac{l_s}{M_a} \prod_{s'=1, s' \neq s}^{S} \left(1 - \frac{l_{s'}}{M_a}\right) \quad (2)$$

The strategy probability values (i.e., $P=\{p_{l_s}\}=\{p_1, p_2, \ldots, p_{M_a}\}$) correspond to a plurality of potential probability combinations and each of the potential probability combinations comprises a plurality of probability values. The processor 13 selects one of the potential probability combinations that maximizes the expected value (i.e., E[j]) and sets the probability values of the potential probability combination that maximizes the expected value (i.e., E[j]) as the strategy probability values. Specifically, the processor 13 may derive the strategy probability values according to Equation (3):

$$P^* = \arg \sum_A \max E[j] \quad (3)$$

In Equation (3), the parameter A represents all potential probability combinations and all the potential probability combinations in the set A satisfy the Nash equilibrium. After obtaining the strategy probability values P*, the processor 133 further calculates the assigned number according to a probability value that any of the $M_a$ available network resource units is not used by any of the femto-BS 13 and the neighboring femto-BSs (i.e., the femto-BSs 15, 17, and 19), a number of the available network resource units that are used by more than one of the femto-BS 13 and the neighboring femto-BSs (i.e., the femto-BSs 15, 17, and 19), and a number of the available network resource units that are not used by any of the femto-BS 13 and the neighboring femto-BSs (i.e., the femto-BSs 15, 17, and 19). For example, the processor 133 may calculate the assigned number according to Equation (4):

$$u_1(l_1, P) = \sum_{l_S, s \neq 1} \sum_{y=0}^{M_a - \max(l_2, \ldots, l_S)} \sum_{x=0}^{M_a} (1-x) \quad (4)$$

$$\frac{C_x^{M_a-y} C_{l_1-x}^y}{C_{l_1}^{M_a}} C_y^{M_a} q_0^y (1-q_0)^{M_a-y} p_{l_2} \ldots p_{l_S}$$

where the parameter $q_0$ represents the probability value that any of the $M_a$ available network resource units is not used by any of the femto-BS 13 and the neighboring femto-BSs (i.e., the femto-BSs 15, 17, and 19), the parameter x represents the number of the available network resource units that is used by more than one of the femto-BS 13 and the neighboring femto-BSs (i.e., the femto-BSs 15, 17, and 19), and the parameter y represents the number of the available network resource units that is not used by any of the femto-BS 13 and the neighboring femto-BSs (i.e., the femto-BSs 15, 17, and 19). Thereafter, the transceiver 131 can access the assigned number (i.e., $u_1(l_1, P)$) of the available network resource units among the $M_a$ available network resource units.

Figure 2:
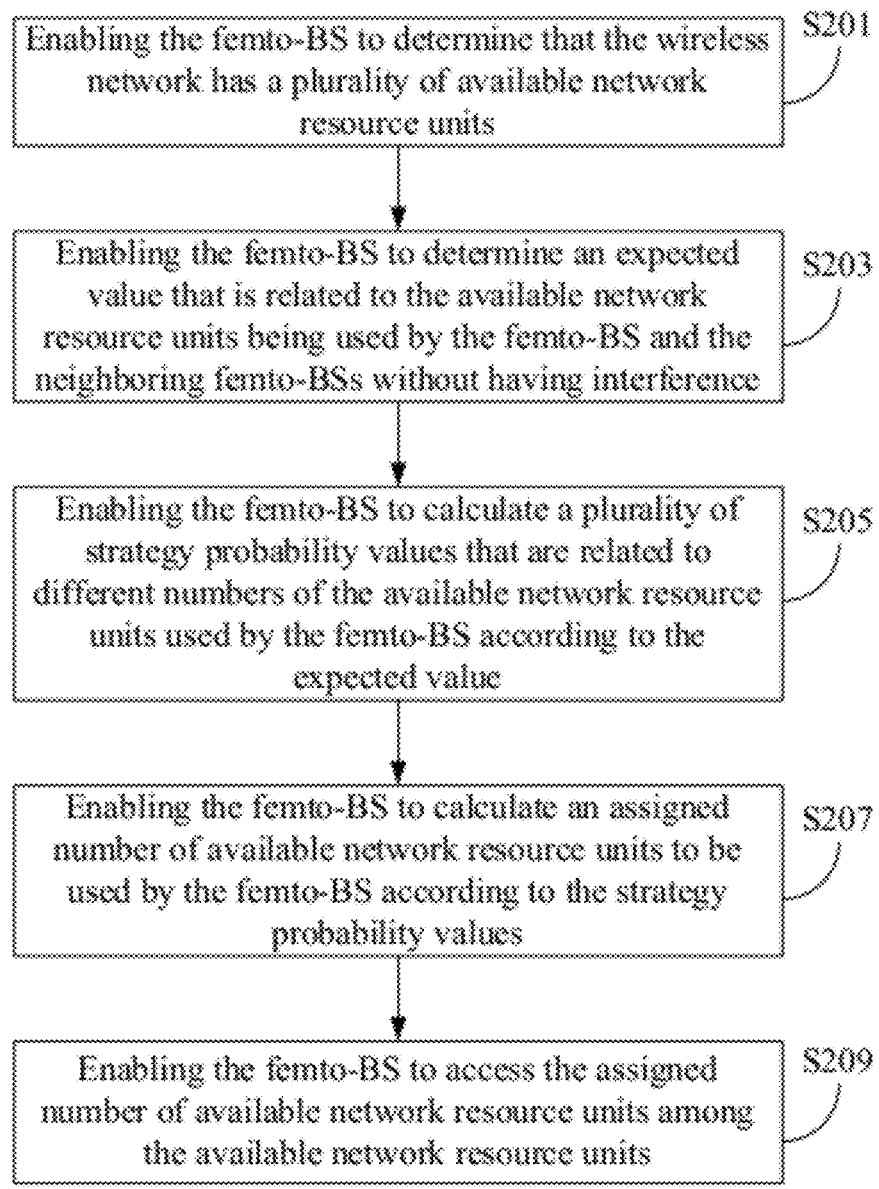
FIG. 2 is a flowchart of a network resource allocation method of a third embodiment of the present invention.

A third embodiment of the present invention is a network resource allocation method, whose flowchart is depicted in FIG. 2. The network resource allocation method can be used in a femto-BS, e.g., the femto-BS 13 (and/or the femto-BSs 15, 17, and 19) of the first embodiment and the second embodiment. The femto-BS has a plurality of neighboring femto-BSs. The femto-BS and the neighboring femto-BSs belong to a same wireless network.

Firstly, the network resource allocation method executes step S201 to enable the femto-BS to determine that the wireless network has a plurality of available network resource units. The available network resource units vary with the encoding technology adopted by the wireless network. As an example, if the OFDM technology is adopted in the wireless network, then a network resource unit is a resource block in a frame. As another example, if the WCDMA technology is adopted in the wireless network, the network resource unit will be a ratio of code division.

Next, step 203 is executed to enable the femto-BS to determine an expected value that is related to the available network resource units being used by the femto-BS and the neighboring femto-BSs without having interference. The expected value is related to the number of the available network resource units and the number of the neighboring femto-BSs.

For example, the femto-BS can utilize the number of the available network resource units and the number of the neighboring femto-BSs to determine the expected value.

In other embodiments, in addition to the number of the available network resource units and the number of the neighboring femto-BSs, the network resource allocation method may further utilize a plurality of strategy probability values that are related to different numbers of the available network resource units used by the femto-BS as well as a probability value that any of the available network resource units is used by only one of the femto-BS and the neighboring femto-BSs in step S203 to determine the expected value. In a preferred embodiment, the network resource allocation method can employ Equation (1) described above to execute the step S203.

Subsequent to step S203, step S205 is executed to enable the femto-BS to calculate a plurality of strategy probability values that are related to different numbers of the available network resource units used by the femto-BS according to the expected value.

The strategy probability values may be selected from a plurality of potential probability combinations and each of which comprises a plurality of probability values. Therefore, the step S205 may enable the femto-BS to select one of the potential probability combinations that maximizes the expected value and to set the probability values of the potential probability combination that maximizes the expected value as the strategy probability values. If Equation (1) is used in the step S203 in the network resource allocation method, then Equation (3) will be used in the step S205.

Subsequent to step S205, step S207 is executed to enable the femto-BS to calculate an assigned number of available network resource units that can be used by the femto-BS according to the strategy probability values.

In other embodiments, the network resource allocation method may further calculate the assigned number according to a probability value that any of the available network resource units is not used by any of the femto-BS and the neighboring femto-BSs, a number of the available network resource units that are used by more than one of the femto-BS and the neighboring femto-BSs, and a number of the available network resource units that are not used by any of the femto-BS and the neighboring femto-BSs in the step S207. In a preferred embodiment, the network resource allocation method can use Equation (4) to execute the step S207.

Finally, step S209 is executed to enable the femto-BS to access the assigned number of available network resource units among the available network resource units.

In addition to the aforesaid steps, the third embodiment can also execute all the operations and functions set forth in the first embodiment and the second embodiment. How the third embodiment executes these operations and functions will be readily appreciated by those of ordinary skill in the art based on the explanation of the first embodiment and the second embodiment, and thus will not be further described herein.

The network resource allocation method described in the third embodiment may be implemented as a computer program. The computer program comprises a plurality of codes. When the computer program is loaded into a computer or a femto-BS and the codes comprised therein are executed, the network resource allocation method described in the third embodiment can be accomplished. The computer program product may be stored in a non-transitory tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

According to the above descriptions of the first embodiment to the third embodiment, it is understood that the present invention utilizes surrounding environment information (e.g., the number of available network resource units and the number of neighboring femto-BSs) of the femto-BS for network resource allocation, so the network resources can be utilized efficiently and occurrence of interferences is reduced.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A femtocell base station (femto-BS), having a plurality of neighboring femto-BSs, the femto-BS and the neighboring femto-BSs belonging to a wireless network, the femto-BS comprising:
    a transceiver being configured to receive a frame; and
    a processor being electrically connected to the transceiver and being configured to perform the operations as follows:
        determining that the wireless network has a plurality of available network resource units according to the frame,
        determining an expected value that is related to the available network resource units being used by the femto-BS and the neighboring femto-BSs without having interference, the expected value being related to a number of the available network resource units and a number of the neighboring femto-BSs,
        calculating a plurality of strategy probability values that are related to different numbers of the available network resource units used by the femto-BS according to the expected value, and
        calculating an assigned number according to the strategy probability values, wherein the femto-BS is able to use the assigned number of the available network resource units.

2. The femto-BS as claimed in claim 1, wherein the processor utilizes the number of the available network resource units and the number of the neighboring femto-BS to determine the expected value.

3. The femto-BS as claimed in claim 1, wherein the processor determines the expected value according to the number of the available network resource units, the number of the neighboring femto-BSs, the strategy probability values, and a probability value that any of the available network resource units is used by only one of the femto-BS and the neighboring femto-BSs.

4. The femto-BS as claimed in claim 1, wherein the processor calculates the strategy probability values by using a plurality of potential probability combinations, each of the potential probability combinations comprises a plurality of probability values, the processor selects one of the potential probability combinations that maximizes the expected value, and the processor sets the probability values of the potential probability combination that maximizes the expected value as the strategy probability values.

5. The femto-BS as claimed in claim 1, wherein the processor calculates the assigned number according to a probability value that any of the available network resource units is not used by any of the femto-BS and the neighboring femto-BSs, a number of the available network resource units that are used by more than one of the femto-BS and the neighboring femto-BSs, and a number of the available network resource units that are not used by any of the femto-BS and the neighboring femto-BSs.

6. The femto-BS as claimed in claim 1, wherein the transceiver further accesses the assigned number of the network resource units.

7. The femto-BS as claimed in claim 1, wherein the wireless network adopts the technology of Orthogonal Frequency Division Multiplexing (OFDM), and each of network resource units is a resource block in the frame.

8. The femto-BS as claimed in claim 1, wherein the wireless network adopts the technology of Wideband Code Division Multiple Access (WCDMA), and each of the network resource units is a ratio of code division.

9. A network resource allocation method, being used in a femto-BS, the femto-BS having a plurality of neighboring femto-BSs, the femto-BS and the neighboring femto-BSs belonging to a wireless network, the network resource allocation method comprising the steps of:
  (a) enabling the femto-BS to determine that the wireless network has a plurality of available network resource units;
  (b) enabling the femto-BS to determine an expected value that is related to the available network resource units being used by the femto-BS and the neighboring femto-BSs without having interference, the expected value being related to a number of the available network resource units and a number of the neighboring femto-BSs;
  (c) enabling the femto-BS to calculate a plurality of strategy probability values that are related to different numbers of the available network resource units used by the femto-BS according to the expected value; and
  (d) enabling the femto-BS to calculate an assigned number according to the strategy probability values, wherein the femto-BS is able to use the assigned number of the available network resource units.

10. The network resource allocation method as claimed in claim 9, wherein the step (b) enables the femto-BS to utilize the number of the available network resource units and the number of the neighboring femto-BSs to determine the expected value.

11. The network resource allocation method as claimed in claim 9, wherein the step (b) enables the femto-BS to determine the expected value according to the number of the available network resource units, the number of the neighboring femto-BSs, the strategy probability values, and a probability value that any of the available network resource units is used by only one of the femto-BS and the neighboring femto-BSs.

12. The network resource allocation method as claimed in claim 9, wherein the step (c) enables the femto-BS to calculate the strategy probability values by using a plurality of potential probability combinations, each of the potential probability combinations comprises a plurality of probability values, the step (c) comprises the following steps:
  enabling the femto-BS to select one of the potential probability combinations that maximizes the expected value; and
  enabling the femto-BS to set the probability values of the potential probability combination that maximizes the expected value as the strategy probability values.

13. The network resource allocation method as claimed in claim 9, wherein the step (d) enables the femto-BS to calculate the assigned number according to a probability value that any of the available network resource units is not used by any of the femto-BS and the neighboring femto-BSs, a number of the available network resource units that is used by more than one of the femto-BS and the neighboring femto-BSs, and a number of the available network resource units that is not used by any of the femto-BS and the neighboring femto-BSs.

14. The network resource allocation method as claimed in claim 9, further comprising the step of:
  enabling the femto-BS to access the assigned number of the network resource units.

15. The network resource allocation method as claimed in claim 9, wherein the wireless network adopts the technology of OFDM, and each of network resource units is a resource block in a frame.

16. The network resource allocation method as claimed in claim 9, wherein the wireless network adopts the technology of WCDMA, and each of network resource unit is a ratio of code division.

17. A non-transitory tangible machine-readable medium, being stored with a computer program, the computer program being able to execute a network resource allocation method when being loaded into an electronic device, and the network resource allocation method comprising the steps of:
  (a) enabling the femto-BS to determine that the wireless network has a plurality of available network resource units;
  (b) enabling the femto-BS to determine an expected value that is related to the available network resource units being used by the femto-BS and the neighboring femto-BSs without having interference, the expected value being related to a number of the available network resource units and a number of the neighboring femto-BSs;
  (c) enabling the femto-BS to calculate a plurality of strategy probability values that are related to different numbers of the available network resource units used by the femto-BS according to the expected value; and
  (d) enabling the femto-BS to calculate an assigned number according to the strategy probability values, wherein the femto-BS is able to use the assigned number of the available network resource units.

* * * * *